United States Patent
Hruska et al.

(10) Patent No.: US 8,126,647 B2
(45) Date of Patent: Feb. 28, 2012

(54) LITHOFACIES CLASSIFICATION SYSTEM AND METHOD

(75) Inventors: Marina M. Hruska, San Ramon, CA (US); William C. Corea, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 941 days.

(21) Appl. No.: 12/098,533

(22) Filed: Apr. 7, 2008

(65) Prior Publication Data

US 2009/0254281 A1 Oct. 8, 2009

(51) Int. Cl.
*G01V 3/38* (2006.01)
*G06F 19/00* (2011.01)

(52) U.S. Cl. .......................................... 702/7

(58) Field of Classification Search .................. 702/7
See application file for complete search history.

(56) References Cited

U.S. PATENT DOCUMENTS

| | | | |
|---|---|---|---|
| 6,295,504 B1 | 9/2001 | Ye | |
| 6,871,165 B2 | 3/2005 | Aggarwal | |
| 2005/0169548 A1* | 8/2005 | Ducksburg et al. | 382/240 |
| 2009/0030614 A1* | 1/2009 | Carnegie et al. | 702/6 |

FOREIGN PATENT DOCUMENTS

GB 2345776 A 7/2000

OTHER PUBLICATIONS

Pengbo and Home, A Multiresolution Approach to Reservoir Parameter Estimation Using Wavelet Analysis, SPE 62985, Oct. 2000, XP002533841.

Sahni and Home, Multiresolution Wavelet Analysis for Improved Reservoir Description, SPE 87820, Feb. 2005, XP002533842.

I. Sahni, Multiresolution Reparameterization and Partitioning of Model Space for Reservoir Characterization, PHD, Aug. 2006, XP002533840 Stanford abstract, p. 1-p. 9, p. 25-p. 67, p. 162-p. 169, figures 4.53, 5.41-5.44.

Article from What's Happening in the Mathematical Sciences, "Parlez-vous Wavelets?" pp. 23-26, obtained from http://pacm.princeton.edu/~ingrid/.

Matos et al., "Unsupervised seismic facies analysis using wavelet transform and self-organizing maps", Geophysics. vol. 72, No. 1, Jan.-Feb. 2007, pp. 9-21.

Heeger et al., "Pyramid-Based Texture Analysis/Synthesis", 7 pages, Proc. ACM SIGGRAPH, Aug. 1995.

(Continued)

*Primary Examiner* — Cindy H Khuu
(74) *Attorney, Agent, or Firm* — Carlos L. Hanze

(57) ABSTRACT

A method of analyzing characteristics of a subterranean formation includes applying a wavelet transform to measured data or to derived data obtained from the measured data, the measured data obtained by measuring a physical property at each of a plurality of positions in a borehole that penetrates the subterranean formation; selecting one or more scales for analyzing wavelet coefficients; performing a segmentation of the data; calculating a distribution of wavelet coefficients for each scale, for one or more spatial directions of wavelet transform application, for the wavelet transform of the data and for each segment that belongs to the portion on which the wavelet transform has been calculated; and for each segment, analyzing a distribution of the data and the distribution of the wavelet coefficients for each scale in terms of their overlap with corresponding distributions of training samples to produce a geological interpretation of the subterranean formation.

24 Claims, 11 Drawing Sheets

OTHER PUBLICATIONS

Robail et al., "Sedimentary Bodies Identification Using the Phase Coefficient of the Wavelet Transform", SPWLA 42$^{nd}$ Annual Logging Symposium, Jun. 17-20, 2001, 26 pages.

Xiuweng Liu, Texture Classification Using Spectral Histograms, IEEE Transactions on Image Processing, vol. 12, No. 6, Jun. 2003, pp. 661-670.

C. Valens, "A Really Friendly Guide Wavelet", Internet website article obtained from http://pagesperso-orange.fr/polyvalens/Clemens/wavelets/wavelets.html#section2, Copyrights 1999-2004; 23 pages.

C. Valens, "The Fast Lifting Wavelet Transform", Internet website article obtained from http://pagesperso-orange.fr/polyvalens/Clemens/lifting/lifting.html, Copyrights 1999-2004; accessed Apr. 3, 2008; 26 pages.

C. Valens, "EZW encoding", Internet website article obtained from http://pagesperso-orange.fr/polyvalens/Clemens/ezw/ezw.html, Copyrights 1999-2004; accessed Apr. 3, 2008; 23 pages.

Wikipedia search results for "Wavelet", obtained from http://en.wikipedia.org/wiki/Wavelet, accessed Apr. 3, 2008; 11 pages.

* cited by examiner

• CLASSES FOR FEATURE FUSION CRITERIA IN A DEEPWATER ENVIRONMENT WITH SEVEN FACIES (LABELED FACIES 1,5,6,8,10,11).

Classes for feature fusion criteria in a deepwater depositional environment with 7 facies (labeled 1,5,6,7,8,10 and 11)

| Line | Class name | Member facies | k1 (res.) | k2 (1/8 ft w.c.) | k3 (1/16 ft w.c.) |
|---|---|---|---|---|---|
| ——— | Cm (m=1,5,6,8,11) | m | m | any | any |
| - - - - - | Cwc | 7 and 10 | 7 or 10 | 7 or 10 | 7 or 10 |
| - - - - | Cm_2 (m=6,7,8,10) | m | 7 | m | any |
| — — — | C11prime | 11 | 7 | 1,5 or 11 | any |
| ——— | C_3 | 6,8 and 10 | 10 | any | any |
| —··—··— | C_last | 6 | 10 | 1,5,6 or 7 | 1,5 or 6 |

Table 2: An easy look-up table for finding all facies (in column 'Member facies') which have representative samples that have noted combinations of indicated facies k1, k2 and k3 (the last three columns on the right) by the feature d1, d2 and d3 distributions, where d1 is microresistivity, d2 represents 1/8ft-scale - and d3 the 1/16ft-scale resistivity wavelet transform in a deepwater depositional environment. The line symbol in column 1 matches lines used to outline classes in the Figure 7a.

FIG. 7b

LITHOFACIES CLASSIFICATION SYSTEM AND METHOD

FIELD

The present invention relates generally to characterization of geologic data and more particularly to automated interpretation of borehole log data.

BACKGROUND

Borehole data are collected via a number of techniques including, for example, resistivity/conductivity measurements, ultrasound, NMR, and radiation scattering. Conventionally, borehole data is analyzed by human interpreters in order to characterize a subsurface geological formation to allow decisions to be made regarding potential of the well or to determine information about the nature of the surrounding geologic area. Borehole data of this type may be used to replace or supplement the collection of cores for direct inspection.

SUMMARY

In an aspect of the invention, there is provided a method of analyzing characteristics of a subterranean formation including applying a wavelet transform to measured data or to derived data obtained from the measured data, or to a portion thereof, the measured data obtained by measuring at least one physical property at each of a plurality of positions in a borehole that penetrates a region of the subterranean formation; selecting one or more scales for analyzing wavelet coefficients at each scale; performing a segmentation of the measured or derived data; calculating a distribution of wavelet coefficients for each scale, for one or more spatial directions of wavelet transform application, for the wavelet transform of the measured or derived data and for each segment that belongs to the portion on which the wavelet transform has been calculated; and for each segment, analyzing a distribution of the measured or derived data and the distribution of the wavelet coefficients for each scale in terms of their overlap with corresponding distributions of training samples to produce a geological interpretation of the subterranean formation.

In another aspect of the invention, there is provided a computer product having machine executable instructions, the instructions being executable by a machine to perform a method for analyzing characteristics of a subterranean formation, the method including calculating a distribution of wavelet coefficients for each scale, for one or more spatial directions of wavelet transform application, for the wavelet transform of measured or derived segmented data and for each segment, the measured data obtained by measuring at least one physical property at each of a plurality of positions in a borehole that penetrates a region of the subterranean formation and the derived data obtained from the measured data; and for each segment, analyzing the distribution of the measured or derived data and a distribution of the wavelet coefficients for each scale in terms of their overlap with corresponding training sample distributions.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 7*a-b* show classes for feature fusion and final classification in a deepwater environment with seven facies in accordance with an embodiment of the invention;

DETAILED DESCRIPTION

Figure 1:
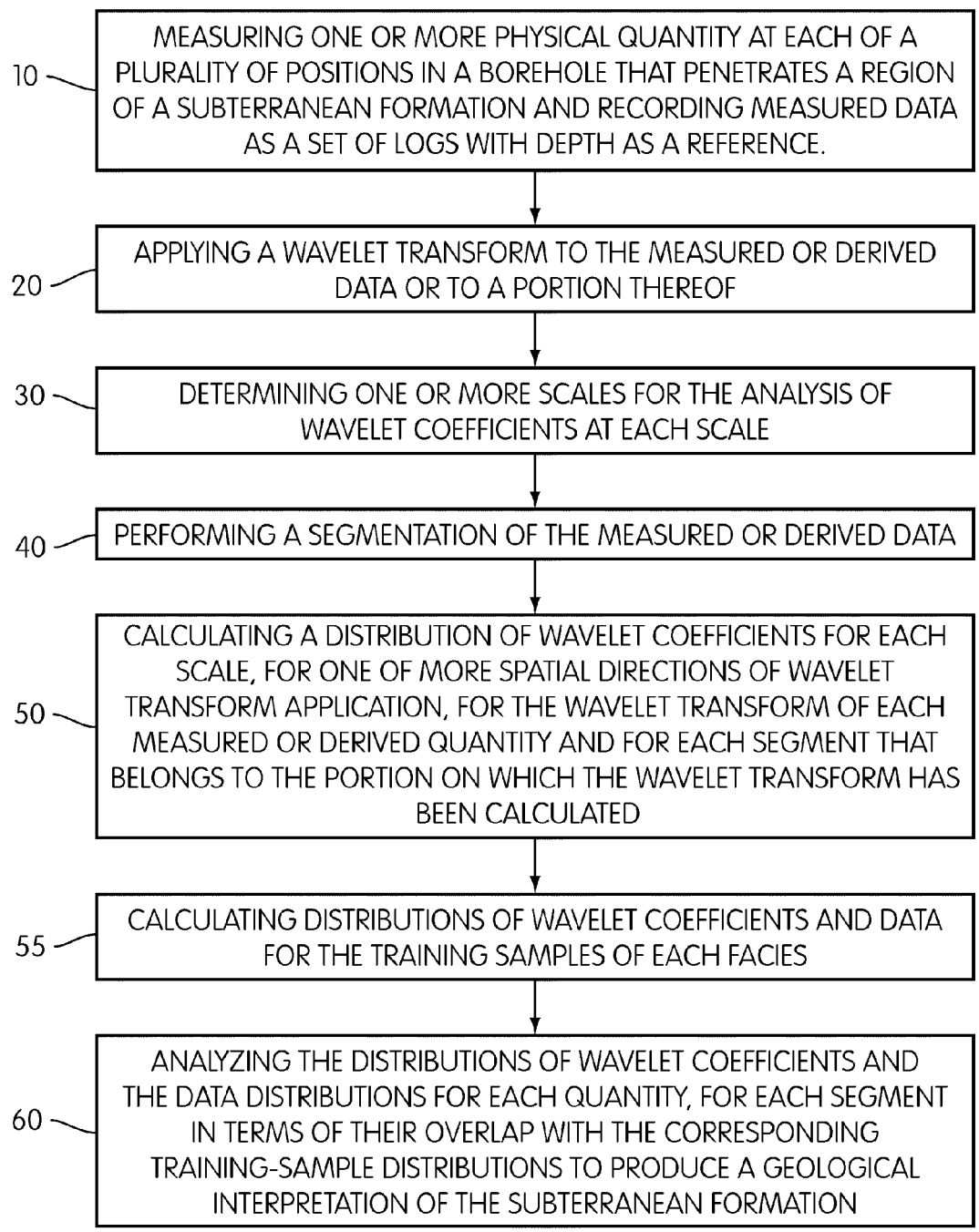
FIG. 1 generally shows a method of analyzing characteristics of subterranean formation in accordance with an embodiment of the invention.

Borehole data are analyzed to determine a geological profile of a subterranean formation. Borehole data are provided by measuring and recording on well-logs physical quantities down the borehole. These physical quantities provide information about the different textures of the materials (facies) that constitute the geological profile of the subterranean formation. Analysis of borehole data generally requires a lot of human activity and may be very time consuming. Therefore, it is desirable to at least semi-automate this analysis. Borehole image analysis has been performed by means of Multi-Resolution Graph Based Clustering (see U.S. Pat. No. 6,295,504 to Ye and Rabiller). Besides the difficulties of adequate matching of automatic versus human interpretation that clustering introduces, there is also a major challenge in texture analysis in general to find a limited number of parameters to model textures that would allow adequate discrimination and synthesis of visually similar samples. Current theories of texture discrimination incorporate the notion that two textures are often difficult to discriminate (i.e. are similar) when they produce a similar distribution of responses in a bank of (orientation and spatial-frequency selective) linear filters (Heeger and Bergen, "Pyramid Based Texture Analysis/Synthesis", Proc. ACM SIGGRAPH, August 1995; Liu and Wang, "Texture Classification Using Spectral Histograms", Image Processing, IEEE Transactions, Vol. 12, Issue 6, Jun. 2003). In an aspect of the invention presented hereinafter, facies classification from well-logs makes use of a wavelet transform of well-log signals and is based on the similarity of distributions of wavelet transform coefficients of segmented data to the corresponding distributions of the facies training samples, whereby the training samples can be provided by an expert and unaltered throughout the application. In this way, classification is done strictly in terms of expert recognized facies and the difficulties of matching the results of an automatic interpretation to those of a human interpreter are significantly diminished.

The wavelet transform is a linear transform which convolves the original signal with a family of functions or wavelets of zero mean that satisfy a known admissibility condition (see Stephane Mallat, "A wavelet Tour of Signal Processing", p. 82, Academic Press, $2^{nd}$ Edition, 1999). The functions belonging to a wavelet family are of a mutually similar shape but translated and/or dilated in the time (or depth) variable. The result of a wavelet transform is termed by wavelet coefficients which are indexed by position (at which the wavelet is centered) and scale (that characterizes the width of the wavelet). A family of wavelets is obtained from the mother wavelet $\Psi(t)$ by shifting it by x and scaling it by a, as shown in equation (1):

$$\psi_{a,x}(t) = \frac{1}{\sqrt{a}} \psi\left(\frac{t-x}{a}\right) \quad (1)$$

Once a family of wavelets is chosen, then the continuous wavelet transform of a function f(t) is defined as (see equation (2)):

$$Wf(a, x) = \frac{1}{\sqrt{a}} \int_{-\infty}^{+\infty} f(t) \psi\left(\frac{t-x}{a}\right) dt \quad (2)$$

where Wf(x,a) are the wavelet coefficients.

Most applications of wavelet families exploit their ability to efficiently approximate particular classes of functions with few non-zero wavelet coefficients (see "A wavelet Tour of Signal Processing" at p. 241), with coefficients of a small magnitude at finest scales generally corresponding to smooth parts of the signal. Among other applications, wavelet transform is useful in characterizing abrupt signal changes (through coefficients of a large locally maximal magnitude around locations of such changes). In an embodiment of the invention, the wavelet transform applied to the original signal is discrete. However, it will be appreciated that a continuous wavelet transform may also be applied to the measured signals. A discrete wavelet transform differs from a continuous wavelet transform in that the convolution is not performed as an integral but as a sum over discrete points x, separated by the given scale a.

In an embodiment of the invention described herein, data segments are classified in terms of a defined similarity to strictly the facies training samples provided by an expert. In this way the difficulties of matching the results of an automatic interpretation to that of a human interpreter are significantly diminished. The facies that is studied may be as small as single foot lithofacies segments (as long as they have relatively well-defined measurable rock properties that set them apart from each other in an expert's view) or larger, depofacies segments of lithofacies aggregates.

FIG. 1 generally shows a method of analyzing characteristics of subterranean formation in accordance with an embodiment of the invention. The method starts at procedure 10 where one or more physical quantities are measured at each of a plurality of positions in a borehole that penetrates a region of the subterranean formation. The physical quantities may be measured with the use of a probe such as that shown in FIG. 2.

Figure 2:
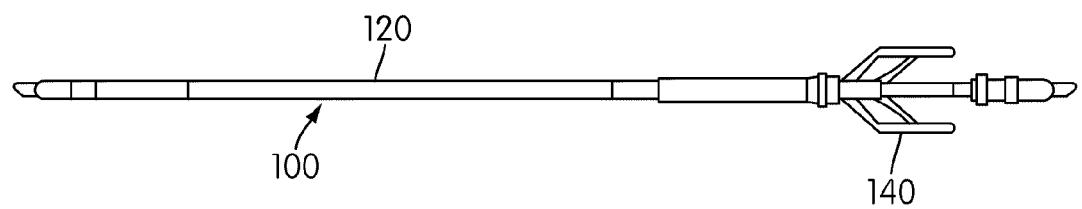
FIG. 2 illustrates an example of a conventional borehole probe.

The probe may be a multi-trace or multi-pad measurement probe. For example, FIG. 2 illustrates a probe 100 for use in borehole characterization that includes a generally elongated shaft 120 having at one end a number of outwardly extending members 140. The outwardly extending members 140 may each include a sensor 160 (shown in more detail in FIGS. 3a and 3b) for interrogating a region 180 of a borehole. The illustrated sensor 160 includes a plurality of pairs of sensors 200 for monitoring a change in voltage that is developed across a portion 220 of region 180 when a current is injected through the current injector electrodes 240.

Figures 3A, 3B:
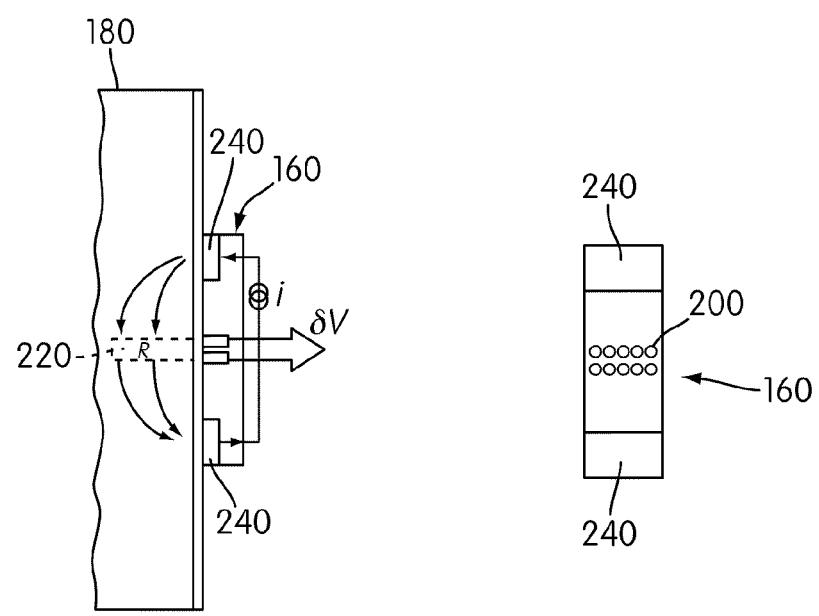
FIGS. 3*a* and 3*b* are side and front views respectively of a sensor portion of a probe as shown in FIG. 2.

Though the sensor 160 shown in FIGS. 3a and 3b is constructed and arranged for measuring electrical characteristics of the borehole material, this is for illustrative purposes only and a wide variety of sensors may be employed in various embodiments of the present invention. In particular, it is envisioned that measurements of resistivity, ultrasound or other sonic waves, complex electrical impedance, neutron reflectivity or transmissivity, nuclear magnetic resonance, video imaging and/or spectrometry may be employed. Furthermore, natural gamma ray emission may be measured. Consistent with this, the sensor 160 may be selected as appropriate for the measurement to be made, and may include, by way of non-limiting example, electrical sources and detectors, radiation sources and detectors, and acoustic transducers. As will be appreciated, it may be useful to include multiple types of sensors on a single probe 100 and various combinations may be usefully employed in this manner.

In use, the probe 100 is generally lowered into the borehole to be characterized. Upon reaching an appropriate depth, which may be the bottom of the hole, or a selected intermediate depth, the probe is retrieved and measurements are taken as the probe rises through the material. In many cases, the probe 100 will have four sensors 160 so that the hole may be characterized in each of four directions, which may be denominated 0, 90, 180 and 270, for example.

The operation of the probe 100 will be described using the example of the electrical sensors illustrated in FIGS. 3a and 3b. While resistivity measurements are described here in detail, the particulars will vary in accordance with the particular sensor employed in a given implementation. The probe 100 takes measurements by transmitting, from the electrodes 240, an electrical signal, which may be a DC or AC or otherwise varying current I, at least partially into a region 180 of material of the borehole. As will be appreciated, the penetration of the signal will depend in part on the nature of the measurement. A reflectivity measurement involves nearly no depth of penetration into the material under interrogation, while a resistivity measurement requires the signal to propagate some distance through the material. However, each of the foregoing degrees of penetration should be understood to be within the scope of the present invention.

In the special case of resistivity measurement in oil-based mud, the signal propagates through the material and is received by the sensors 200. The sensors 200 measure a change in voltage δV across a portion 220 of the region 180 that is indicative of a characteristic (in this case, resistivity) of the material that is present in the subterranean formation being characterized. In an embodiment, the resistivity R of the material in the portion 220 may be calculated based on the formula: R=k(δV/I), where I is the current generated by the electrodes 240 and k is a geometrical factor that may be predetermined based on a geometry of the electrodes 240 and the sensors 200. As will be appreciated, this formula depends on the material being relatively uniform within the distance between the electrodes 240. For this reason, the scaling factor k may be implemented as a dynamic scaling, which may provide additional detail.

Figure 4:
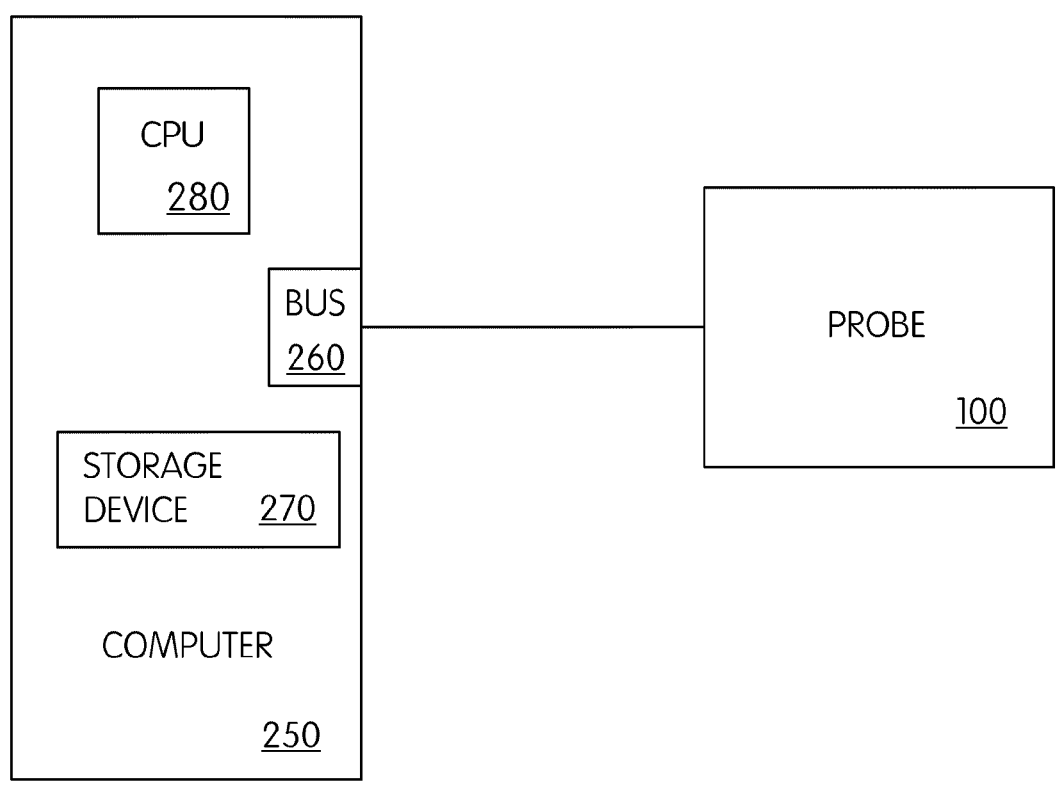
FIG. 4 is a schematic illustration of a probe in communication with a computer in accordance with an embodiment of the invention.

As shown in FIG. 4, borehole data collected by the probe are generally stored in a local memory device as in memorized logging-while-drilling tools or relayed via a wire, though the connection may be made wireless, to a computer 250 that may be, for example, located at a drilling facility where the data may be received via a bus 260 of the computer 250, which may be of any suitable type, and stored, for example, on a computer readable storage device 270 such as a hard disk, optical disk, flash memory, temporary RAM storage or other media for processing with a processor 280 of the computer 250.

Figure 5A:
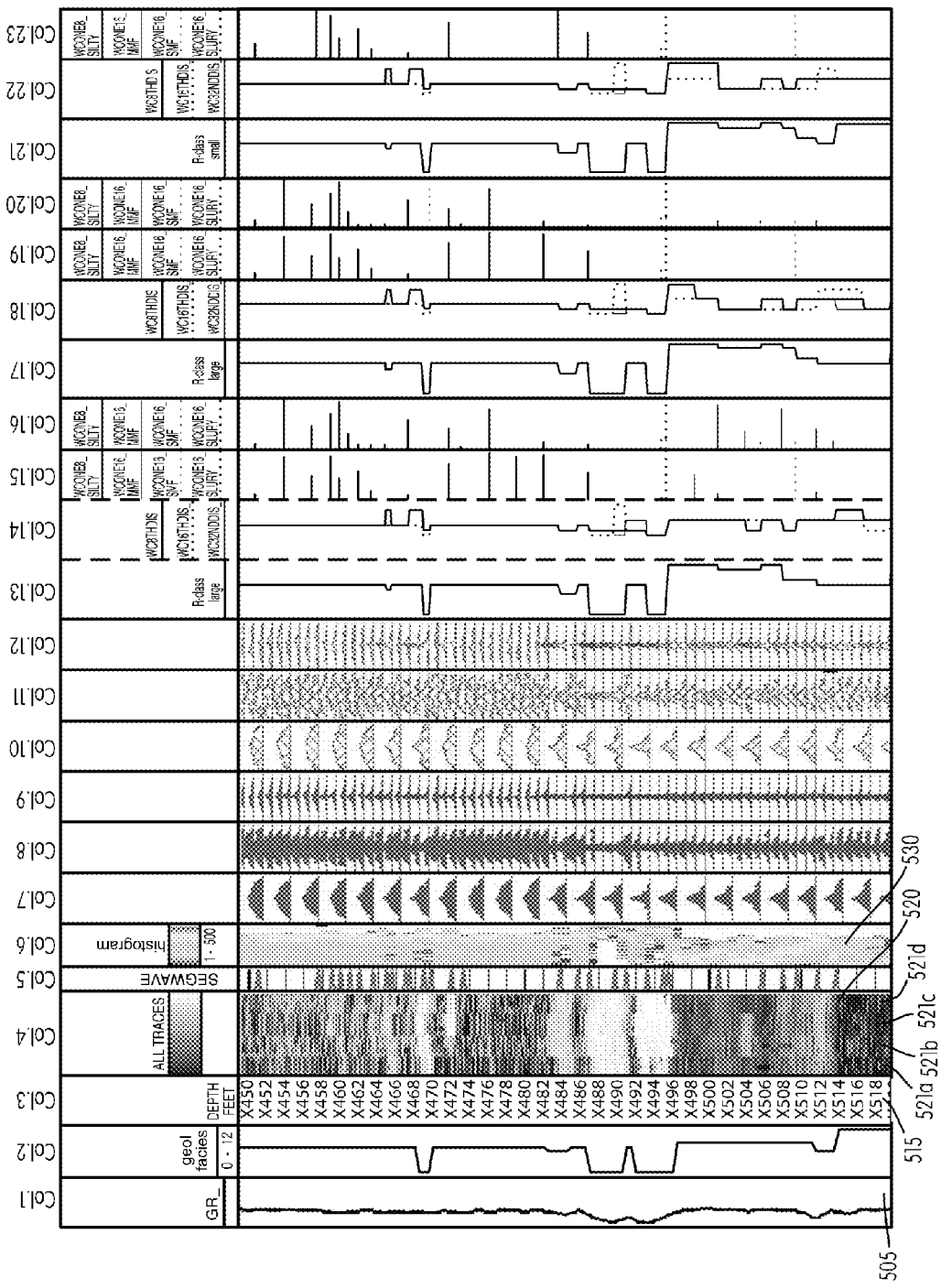
FIG. 5*a* shows gamma ray log (column 1), manually interpreted geological facies (column 2), normalized resistivity traces (column 4), boundaries from a segmentation routine segwave used for a test of the classification method (column 5), resistivity distribution (column 6), wavelet coefficient distributions for $\frac{1}{16}$ foot scale (columns 7-9) and for $\frac{1}{8}$ foot scale (columns 10-12), and intermediate classification results (columns 13-23) as a function of depth in the borehole (column 3), in accordance with an embodiment of the invention.
Figure 5B:
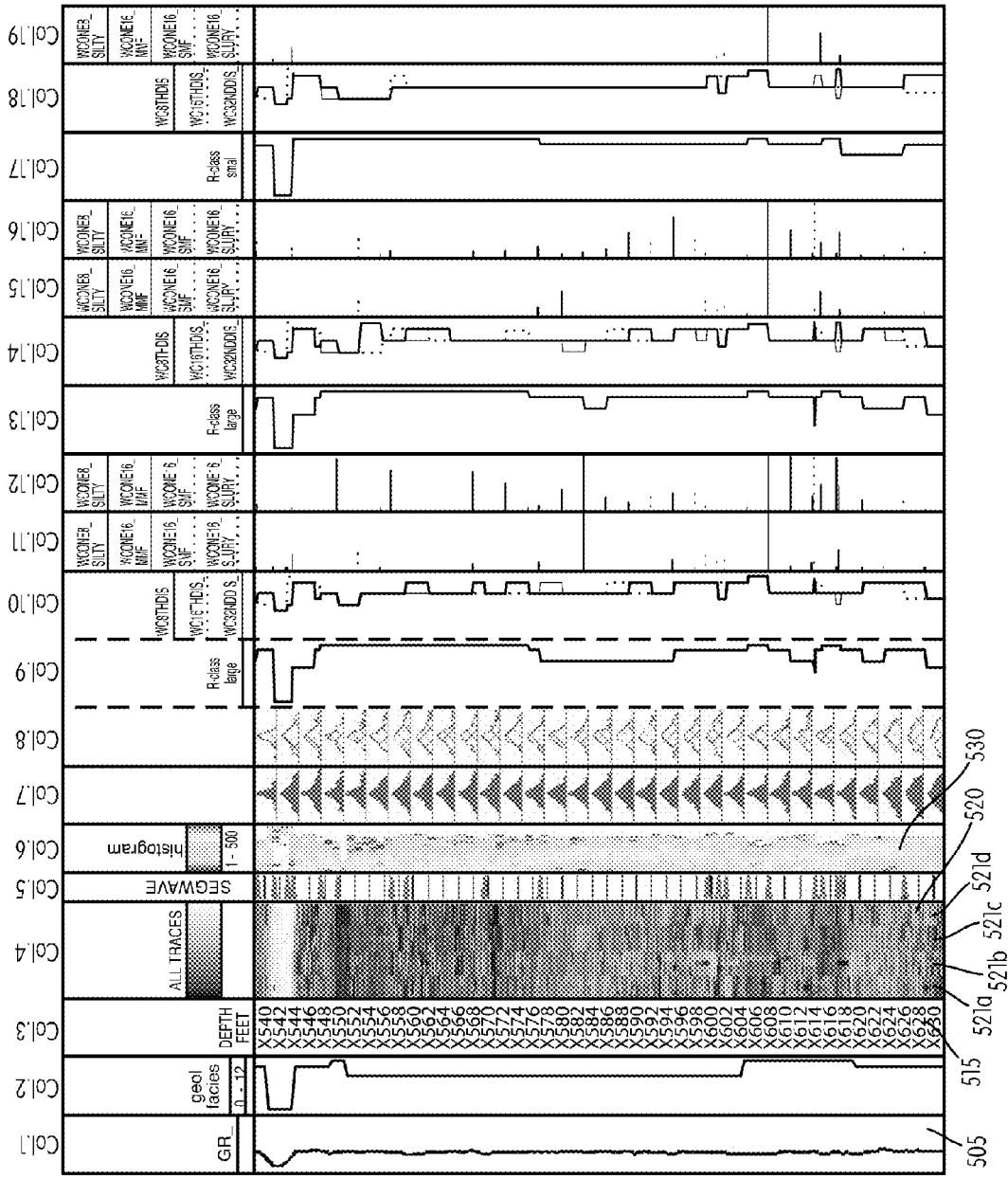
FIG. 5*b* shows gamma ray log (column 1), manually interpreted geological facies (column 2), normalized resistivity traces (column 4), boundaries from a segmentation routine segwave used for a test of the classification method (column 5), resistivity distribution (column 6), wavelet coefficient distribution for $\frac{1}{16}$ foot scale (column 7) and for $\frac{1}{8}$ foot scale (column 8), and intermediate classification results (columns 9-19) as a function of depth in the borehole (column 3), in accordance with an embodiment of the invention.

As shown in FIGS. 5*a-b*, column 4 under the heading "ALL TRACES", the borehole data may be converted to a graphical form, as image data 520 for display and/or further processing. The graphical data may be stored as full-color data (for example, 24-bit JPEG data) or may be single color or gray-scale data. Image data 520 of FIGS. 5*a-b* represent resistivity traces obtained at each of a plurality of positions in a borehole with the OBMI™ tool from Schlumberger. Column 3—heading "DEPTH FEET"—of FIGS. 5*a-b* shows the corresponding depth portion 515 (from x450 to x520 feet) of the borehole for which image data 520 are obtained. These resistivity traces have been normalized. A color is assigned to a resistivity value measured by the sensor to get a picture in resistivity. Image data 520 include four stripes 521*a-d* running down column 4 in FIGS. 5*a-b*. These four stripes represent data from the four sensor pads obtained with the probe 100, with each sensor pad providing five data traces. The darker areas of the image data 520 represent relatively conductive regions and the lighter areas represent relatively resistive regions. In clastic rocks, the darker, more conductive regions may be interpreted as shales, while the lighter, more resistive regions may be sandy regions. In carbonate rocks and in mixed lithology, the texture of resistivity images and physical quantities other than an average resistivity become more important for distinguishing lithofacies as well as depofacies.

Distributions of the physical properties measured by the probe 100 may be provided as a function of depth. For example, from the resistivity measurements (e.g. image data 520 in column 4 of FIGS. 5*a-b*), a resistivity distribution or histogram may be obtained as a function of bore-hole depth. The resistivity distribution 530 calculated for 1 foot depth intervals is shown in column 6 of FIGS. 5*a-b*. This resistivity histogram or distribution 530 captures the brightness of the images for the four traces 521*a-d*. Similar distributions can be obtained for other measured or calculated quantities for depth intervals of appropriate length.

Referring back to FIG. 1, once one or more physical properties are measured at each of a plurality of positions in a borehole that penetrates a region of the subterranean formation (and optionally other derived quantities are calculated from the measured data), the method proceeds to procedure 20 where a wavelet transform is applied to the measured or derived data or to a portion thereof. In the case of resistivity images, the wavelet transform may be applied in the direction along the borehole axis, i.e. on each trace of each pad 521*a-d* independently, or on a data sequence formed from the interpolated data that lies on a curve (or a portion thereof corresponding to a tool pad image, if the tool has pads) constructed on a borehole view of the image (i.e. with each trace arranged in the order of spatial appearance around the borehole) as the cross-section of the borehole wall and a bedding plane or another plane of interest. In the case when the borehole segment is a perfect cylinder, this curve is generally a sinusoid. The calculation of a wavelet transform along two directions is locally similar to a two-dimensional wavelet transform, but the direction of application that is not along the borehole axis can vary slowly to stay parallel to bedding.

In an embodiment of the invention, the wavelet transform is a discrete wavelet transform, though it is contemplated that a continuous transform could also be applied in another embodiment of the invention. The wavelet transform may be orthogonal. For example, a Daubechies wavelet of order 2 as a generating wavelet function may be used. It will be appreciated that other wavelet functions may be used in other embodiments of the invention.

At procedure 30 of FIG. 1, a sequence of scales for the analysis of wavelet coefficients is determined in order to capture sharp changes in the signal at various scales. For example, wavelet coefficients may be obtained for three different scales: a first scale, a second scale twice as large as the first scale and a third scale twice as large as the second scale.

It is desirable that the selected scales of procedure 30 be comparable to the length scales of characteristic intrafacies variations of the measured data since the wavelet coefficients at such scales would be most closely related to the original signal changes occurring at that scale and thus related to a facies signature insofar as this signature is present in the measured data. In an embodiment, the length of the scales may be visually selected by looking at the fine-scale variations of the image data 520 that can be geologically interpreted (i.e. without considering the noise-related variations). That is, a few scales are chosen as representative of the intrinsic variabilities of facies at hand, which are also conditional on the resolution of the well-logs analyzed. For example, referring to FIG. 5*a*, roughly ten thin beds can be seen on the first pad data between x480 and x482 feet. For this reason in an embodiment, wavelet coefficients on scales 1/16 foot and 1/8 foot may be used to analyze resistivity image logs 520. Additional and/or different scales (e.g. 1/2 foot, 1/4 foot and 1/32 foot) may be selected for different subterranean environments. Selection of the scales may also be automated with a software or program that automatically defines the most relevant scale lengths. Such software or program may analyze the mean and dispersion of the wavelet energy at each scale from some previously chosen set of scales, over fixed depth intervals around various locations down the borehole. More representative scales to select then are those for which dispersion of wavelet energy per segment down the borehole is not small compared to the mean energy per segment, where the segment length, as will be discussed later, is appropriate for the data resolution and the minimal length of lithofacies units to be recognized by classification.

After selecting the various scales to analyze the distribution of wavelet coefficients, the method of FIG. 1 proceeds to procedure 40 where a segmentation of the measured or derived borehole data is performed. The borehole data (e.g. image data 520) are segmented based on, for example, a homogeneity of local areas. The well-logs, such as the resistivity data 520, are segmented according to any of the available segmentation methods found to be sufficiently sensitive for the data at hand, or by simple uniform splitting. The segmentation may include a step of depthwise readjustment of logs (including traces of a log from a multiple-pad tool) so that geological bed boundaries from different logs appear all at same depth. This step can be performed on a coarse scale in pre-processing, or concurrently with segmentation whereby the readjustment may vary locally. The latter process is suitable for local segmentation methods, but can be utilized in repetitions of a global segmentation method as well. The information on where segment boundaries are down the borehole is stored as 0 (no change) or 1 (segment boundary) in a one-dimensional array with an adequately sensitive sampling of the borehole (e.g., ¼ ft. for deepwater turbidites). In an embodiment, a segmentation scale parameter may be selected such that segments are of a size appropriate for the analysis to be performed, i.e. proportional to the measurement resolution and preferably no larger than the minimal size of the lithofacies units desired to be recognized. This means that the segment size should be large enough to contain a large number of data points to form a smooth distribution, but not too large to comprise multiple lithofacies units. For example, a segment size between 1 and 3 feet is suitable for the analysis of an OBMI™ resistivity image histogram with 40 bins and recognition of lithofacies units from such a histogram. For single-trace and coarser-resolution measurements, such as a natural gamma-ray detection (column 1 of FIGS. 5a-b), the segment size should be at least 10 times larger than the measurement resolution, thus excluding detection and recognition of thin-bedded facies from gamma-ray only. In an embodiment, blocks larger than 3 feet can further be broken up into 3 foot long segments (with a remainder no larger than 3 feet). In a further embodiment, the length of each segment is at least about 30 times larger than the expected regular spacing of measurement points down the borehole.

In another embodiment, segmentation is done by specifying center locations of intervals of equal length which overlap by a predetermined fixed length (related to the difference between the measurement resolution multiplied by 10 and the minimal lithofacies unit length). This embodiment might be preferable for coarse-resolution measurements, because interval locations can be significantly closer than the interval length needed to have a smooth distribution of measured data. These intervals are taken into the classification part of the method in the same sense as if they were non-overlapping segments. For those regions of the borehole where the overlapping intervals are found to belong to different facies, the segmentation and classification procedures are iterated upon in order to refine the boundary locations. For a given pair of intervals, each new triplet of iterations consists of: 1) classifying these intervals at their current center positions, then 2) classifying after shifting the center locations of the overlapping intervals together, whereby performing the shift slightly first towards one borehole end and then 3) classifying after shifting towards the other borehole end by a small fixed iteration step length d. If a shift in one direction causes the classification of one interval to change while the other one is stable and the shift in the opposite direction does not result in different results from those for central position of the intervals, then the next iteration triplet will start from the central position of intervals shifted from the previous iteration triplet central location by the iteration step length d (or its fraction if fine precision is desired) in the direction of that interval which changed its facies membership. If both shifts (i.e. in both directions) result in the same number of intervals changing membership and if that number is either two or zero (either both intervals change facies membership, or none), the iterative process is stopped and the boundary location for this pair of segments is chosen as the centerpoint between the center locations of the intervals in their central position for the last iteration triplet. In cases other than here described for the results of iteration triplets, it is concluded that either the intervals are too large so more than one boundary is affecting the classification (so several boundaries are selected instead of just one, with classification results corresponding to intervals centered halfway between these boundaries), or that the iteration step length is too large, and the iterative process can be restarted with a smaller step length. After finding stable boundaries in the sense of this procedure, the overlapping segments that have the same classification results are merged.

After segmenting the well-logs, a distribution of wavelet coefficients for each wavelet scale selected at procedure 30, for one or more directions of wavelet transform application, and for each segment that belongs to the portion on which the wavelet transform has been calculated is determined at procedure 50. Referring back to FIG. 5a, columns 7, 8 and 9 show distributions of wavelet coefficients for a 1/16 foot scale and for different segment sizes: 3 feet of data on a log scale (column 7) and 1 foot of data (columns 8 and 9). In column 8, the wavelet coefficient distributions are plotted on a log scale, while in column 9 they are plotted on a linear scale. Columns 10, 11 and 12 are analogous to columns 7, 8 and 9, respectively, except that they refer to a ⅛ foot scale. Very different lithofacies in terms of the variability of measured quantity used for classification (e.g. of a very different texture of resistivity image) have distributions of wavelet coefficients that are of substantially different shape. For example, as seen in FIG. 5a, the shape of the 1/16 foot wavelet coefficient distribution in column 7 is substantially different around x454.5 feet and x493.5 feet. Likewise, the shape of the ⅛ foot wavelet coefficient distribution in column 10 is substantially different around x454.5 feet and x493.5 feet.

Then, after calculating a distribution of wavelet coefficients for each wavelet scale and segment, the method proceeds to procedure 55 where the distributions of wavelet coefficients for each scale are calculated for training samples of various selected known facies. Then, the method proceeds to procedure 60 where the distributions of wavelet coefficients and distribution(s) of borehole data (e.g. resistivity distribution 530 in column 6 of FIG. 5a) for each segment are analyzed in terms of their overlap with the corresponding training sample distributions (calculated at procedure 55) in order to produce a geological interpretation of the subterranean formation. This analysis produces a geological interpretation of the subterranean formation in terms of units which are distinct both in their log signature and geologically.

In an embodiment of the invention, procedure 60 involves two main aspects. The first aspect consists of a feature extraction step (from matching each segment distributions of measured data and their wavelet coefficients to the corresponding distributions of the training sample data) and an intermediate classification for each segment of the borehole. The second aspect consists of a feature fusion step and final classification.

In an embodiment, the training samples, which are considered at procedure 55, are in the same set of measured data and are provided by the human interpreter through a reference to their beginning and end depth. The training samples may also be provided through a previously stored library. In this latter case, the distribution of wavelet coefficients for the training samples may already be available. At least one training sample is needed for each facies. In another embodiment of the invention, the training samples are determined by (1) identifying locations in the measured data where there is a local 1 or 2 foot scale (or comparable scale) wavelet coefficient maximum or minimum, the absolute value of which being among the several largest ones calculated on this data; (2) calculating the distribution of measured data or of small-scale (e.g. ⅛ foot or comparable scale) wavelet coefficients for the two 2 foot (or comparable scale) segments around each of such locations (one above and one below); (3) calculating the overlaps of the distributions on these segments pairwise; and (4) selecting a couple or a few of these segments with the smallest mutual overlaps of distributions to be the training samples.

In order to perform the feature extraction step of classification, distributions (e.g. histograms) of measured data and wavelet coefficients pertaining to the training samples are calculated first (procedure 55). Distributions (e.g. histograms) of wavelet coefficients, that are located within windows delineating training samples, are calculated for each of the few chosen wavelet scales (e.g. 1/16 and ⅛ foot scale) selected at procedure 30 and for each of a plurality of selected known facies (as well as for each direction if the more refined method is used). In an embodiment, seven training samples representative of known geological facies are considered. For image data, wavelet transform coefficients for separate traces of data are also included in the same distribution or histogram provided their positions are in the same—or appropriately depth adjusted—window. One training sample of about 3 feet in length of resistivity image data may suffice for each facies. It will be appreciated that if more training samples per facies are provided, one distribution is formed per scale per facies by adding the occurrences of coefficients in a certain magnitude interval in all training samples for that facies.

In an embodiment, these calculations obtained with the training samples representative of known geological facies provide three separate libraries or collections of distributions: (1) a first library including wavelet coefficient distributions for each of the training samples (e.g. seven training samples) at 1/16 foot scale, (2) a second library including wavelet coefficient distributions for each of the training samples (e.g. seven training samples) at ⅛ foot scale and (3) a third library including distributions of borehole data (e.g. amplitude histogram of a signal or pixel histogram for an image) for each of the training samples (e.g. seven training samples). These libraries may then be used to provide an intermediate classification of each of the segments of the borehole.

Figure 6:
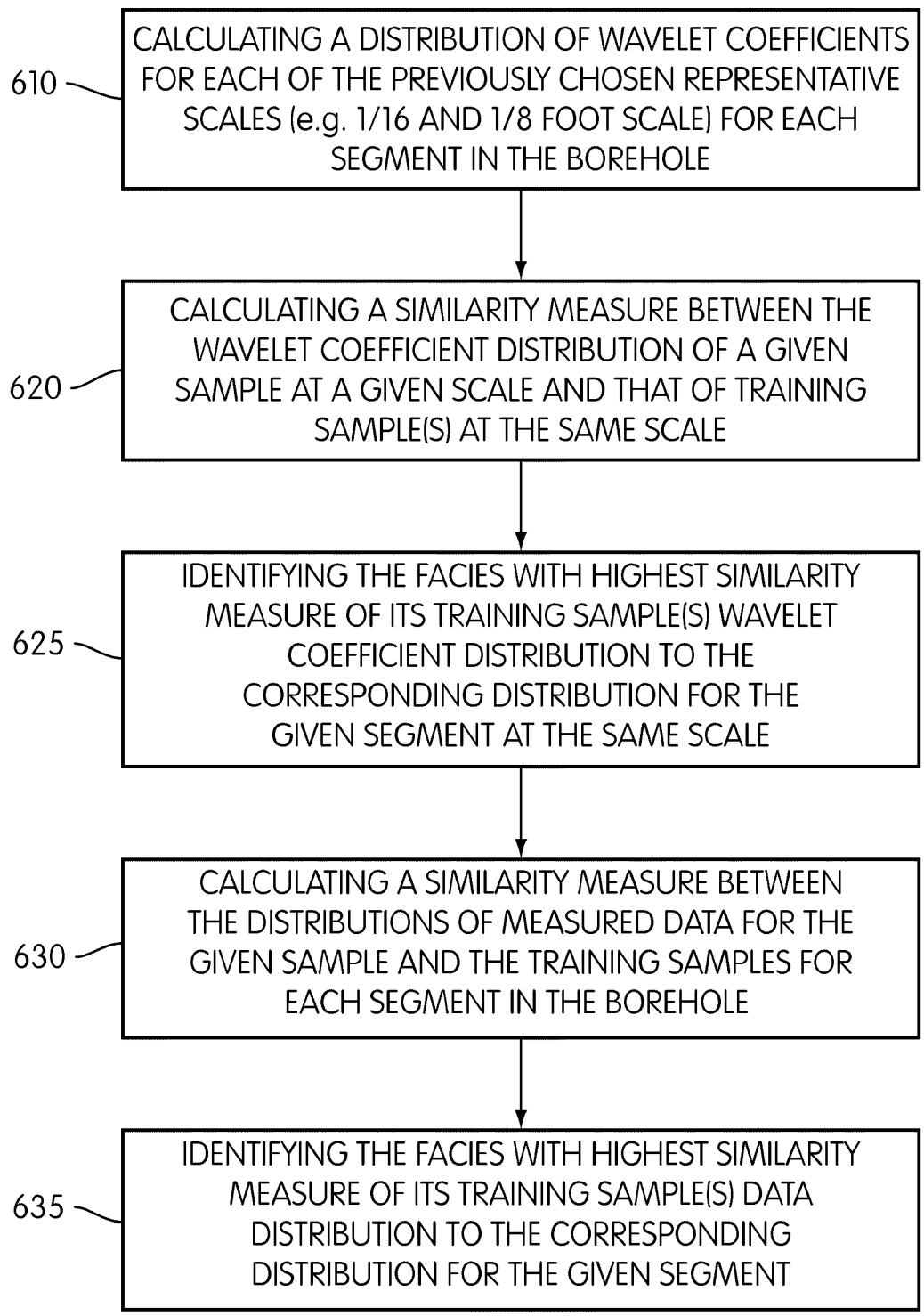
FIG. 6 shows a method for performing feature extraction and intermediate classification for each segment in accordance with an embodiment of the invention.

Referring now to FIG. 6, this figure shows a method of performing feature extraction and intermediate classification for each segment of the borehole in accordance with an embodiment of the invention. The method begins at procedure 610 where a distribution of wavelet coefficients for a property under consideration for each of the previously chosen representative scales (e.g. 1/16 and ⅛ foot scale) is formed for each segment down the borehole. This procedure corresponds to procedure 50 of FIG. 1. Then, the method proceeds to procedure 620 where a similarity measure between the wavelet coefficient distribution of a given sample at a given scale and the distributions of each facies training sample wavelet coefficients at the same scale is calculated. This process is repeated for each scale and each segment. In an embodiment, the distributions of wavelet coefficients of the measured or derived data are compared to the first and second libraries (e.g. 1/16 and ⅛ foot scale) in order to identify the facies in the first and second libraries that have a distribution of wavelet coefficients that most closely corresponds to the distribution of wavelet coefficients obtained with the segmented data (see procedure 625).

A chi-square statistic may be used as a similarity measure to identify the matching training samples or facies. A chi-square statistic of two binned distributions is defined as (4):

$$\chi^2 = \sum_i \frac{\left(\sqrt{\frac{S}{R}} * R_i - \sqrt{\frac{R}{S}} * S_i\right)^2}{R_i + S_i} \quad (4)$$

where $$R = \sum_i R_i \text{ and } S = \sum_i S_i,$$

and $R_i$ and $S_i$ are the respective numbers of the first and second distribution events in the i-th bin (i.e data points of value belonging to the i-th bin), where i takes integer values from 1 to v in order to index those and only those pairs of bins where at least one of the two distributions has a non-zero number of events, and v is called the number of degrees of freedom. The bin size is chosen such that either v is much larger than 1 or the number of events in each bin is large. Under these conditions, the chi-square probability function $Q(\chi^2,v)$, which is an incomplete gamma-function expressing the probability that the sum of the squares of v random normal variables of unit variance and zero mean will be greater than $\chi^2$, is a good approximation of the distribution of $\chi^2$ in equation 4 for the case of a null hypothesis (i.e. hypothesis that (normalized) Ri's and Si's are drawn from the same population) and its use is standard (see W. H. Press et al., "Numerical Recipes in C", p. 621, Cambridge University Press, 1999). A small value of $Q(\chi^2,v)$ indicates that the null hypothesis is rather unlikely (i.e. the given sample data and the training sample data have different distributions). In FIG. 5a, columns 15 and 16 display $Q(\chi^2,v)$ as sticks for the segments shown in column 5 (seven sticks of different color—one for each facies—per segment) for scales 1/16 foot and ⅛ foot, respectively. Columns 19 and 20 of FIG. 5a are analogous to columns 15 and 16, respectively, with the only difference being that a training sample for facies 8 present in the region around x500 ft was different. In FIG. 5b, columns 11, 12, 15, 16 and 19 display $Q(\chi^2,v)$.

The known geological facies with a wavelet coefficient distribution for the considered property at a given scale that matches most closely (as defined by the largest chi-square probability $Q(\chi^2,v)$ at a given number of degrees of freedom v) the same scale wavelet coefficient distribution of the given segment is selected to be the result of intermediate classification of the segment based on the considered property's wavelet coefficient distribution at this scale (see procedure 625), and this facies is referred to as the facies indicated for this segment by the considered property's wavelet coefficient distribution at this scale, or as the comparison result of this segment with the considered property's wavelet coefficient distribution at this scale. Column 14 of FIG. 5a displays results of such an intermediate classification for scales ⅛ foot, 1/16 foot and 1/32 foot, wherein the facies code (indexed 0-12) is the same as the one in column 2 from the manual interpretation, except for being rescaled by an unessential factor 10. Column 18 of FIG. 5a is analogous to column 14 with the sole difference being the training sample for the facies 8. Columns 21-23 of FIG. 5*a* are analogous to columns 17-19 except that segments larger than 3 feet were not partitioned into 3 foot blocks (with a remainder).

Then, after identifying the closest matches for the wavelet coefficient distributions at various scales (e.g. using the first and second libraries of distributions), the method proceeds to procedure 630 where a similarity measure is calculated between the data distributions of a measured borehole property or derived quantity for the given sample (e.g. gamma-ray amplitude histogram or resistivity image pixel histogram) and the training samples for each segment down the borehole. For example, in an embodiment, the resistivity distribution 530 for each segment shown in column 6 of FIG. 5*a* is compared to the distributions of resistivity of the known facies in the third library. The known geological facies with a pixel training distribution or amplitude in the third library that most closely matches the pixel distribution or amplitude distribution of the given segment is determined to be the result of intermediate classification of this segment based on distribution of this data property (see procedure 635), or the facies indicated for this segment by the data distribution of this property.

Although the similarity measures have been performed with a chi-square statistic, it is contemplated that other statistics could be used in other embodiments of the invention.

In the event of uniform segmentation with non-overlapping intervals, additional checks may be performed to refine the segment boundaries. These checks may include finding the best matches for single foot segments within larger segments of uniform length and shifting boundaries if a single foot segment next to a boundary matches the same facies as the neighboring larger segment.

In an embodiment, the feature extraction from distributions of wavelet coefficients performed at an angle to the borehole axis proceeds in an analogous fashion.

Once the facies indicated by all considered distributions are determined for each segment, this information is used to make a final determination of the facies of each segment. This process, which may be referred to hereinafter as the feature fusion step, is applied for each segment down the borehole.

The feature fusion process includes rules that specify which facies should be identified as the final result for a segment. The segment is characterized by certain feature flags and by facies $k1, k2, \ldots, kn$ indicated by distribution of features (measured properties or calculated/derived quantities) $d1, d2, \ldots, dn$ respectively, where $d1, d2, \ldots, dn$ are e.g. the measured or derived borehole data (e.g. in the third library) or wavelet transform coefficients of various measured properties or of derived quantities at various scales (i.e. those making the first and second libraries) from the wavelet transform performed along the borehole axis or along a different direction. The rules are based on discerning classes of all facies which satisfy some class property defined on the indicated facies $k1', k2', \ldots, kn'$ of the facies' representative samples with distributions of features $d1, d2, \ldots, dn$, respectively and on their feature flags.

A feature flag of a segment is defined for a specific property (feature) $p1$ and signifies if that property changes significantly when measured around the borehole axis in the same segment. In the case when $p1$ is the resistivity data from a multiple pad probe, or the wavelet transform of such data, the $p1$ feature flag signifies whether the distribution of $p1$ varies significantly from one pad to another, as evidenced from whether the facies matched to different pad samples in a segment in the intermediate classification based on feature $p1$ are substantially different according to some rule. The rule that specifies substantially different facies for this purpose can be built-in for a particular depositional environment. The presence of such different pad images in the same segment rather indicates another, discontinuous type of a facies.

For example, in a shallow marine depositional environment, according to an embodiment of the invention, one of the feature flags is calculated in the following way from the pad-to-pad variability of the ⅛ foot resistivity wavelet coefficient distribution calculated for separate pads. First, the comparison is made on the ⅛ foot wavelet coefficient distribution for each pad and the ⅛ foot wavelet coefficient distribution of the facies training samples. The facies indicated for a given pad by (or a comparison result with) the ⅛ ft resistivity wavelet coefficient distribution is the facies with the best similarity measure. Further, a comparison result is deemed strong if the corresponding chi-square probability is higher than a certain threshold value, e.g. 50%. Second, if there are two pads that have strong comparison results which are facies incompatible to coexist in a single continuous facies across the borehole according to the rule of substantially different facies, then the facies flag indicates the discontinuous facies. Substantially different facies for a shallow marine environment are any of the homogeneous facies when occurring on one pad and thick-bedded facies on another pad. This procedure can be expanded to require that there does not exist a strong comparison result of a second-highest similarity measure (a strong second-best match) other than bedded or chaotic facies on the pad matched with bedded facies.

A class property defined on a facies with representative training samples that have comparison results $k1, k2, \ldots, kn$ with distributions of features $d1, d2, \ldots, dn$, respectively, and on feature $p1$ flag, is a property that this class contains all facies which may have the ordered (n+1)-tuplet $(k1, k2, \ldots, kn, p1 \text{ flag})$ belong to a direct product $(S1 \times S2 \times \ldots \times Sn \times Sp1)$ of subsets $S1, \ldots, Sn, Sp1$, so that $k1$ may belong to a subset of all facies $S1$, while $k2$ belongs to a facies subset $S2$, and so on until $kn$ belongs to a facies subset $Sn$, and that the feature $p1$ flag indicates a facies subset, i.e. belongs to a facies subset $Sp1$, and that all facies in at least one subset do occur in the corresponding comparison results of the representative samples for each of the facies in this class. The latter specification is meant to avoid redundancy in the class definition, so that 1) only those facies can be in the same class whose representative samples have similar appearance in terms of the facies indicated for them by the distribution of a certain feature, and that 2) the set of facies that belong to a class is not a union of two or more subsets of facies which satisfy not just the class property but a more restrictive property of the facies indicated by this same feature distribution which was used to define the original class. Representative samples of a facies denote those samples of a facies that can reasonably be described by an expert to represent this facies. This ensures that outliers (as well as "split decision" samples) are disregarded, and the spread in comparison results that can be obtained on the representative samples of a facies is small. A class whose facies only occur with the comparison results described in their class property supports the method of elimination reasoning, which is described below in the feature fusion step (c) and shown in the example of a deepwater depositional environment class C_layered. Such a class may be referred to as an enclosure class. A class property and the knowledge of all facies which belong to that class is useful to identify a subset of facies to which the given segment's facies belongs if the facies indicated for this segment are consistent with this class property. For a single-facies class, its member facies m is identifiable by the corresponding class property. If the corresponding class property is based on the facies indicated by just one feature d distribution, that facies m is identifiable by the feature d distribution.

Figure 7A:
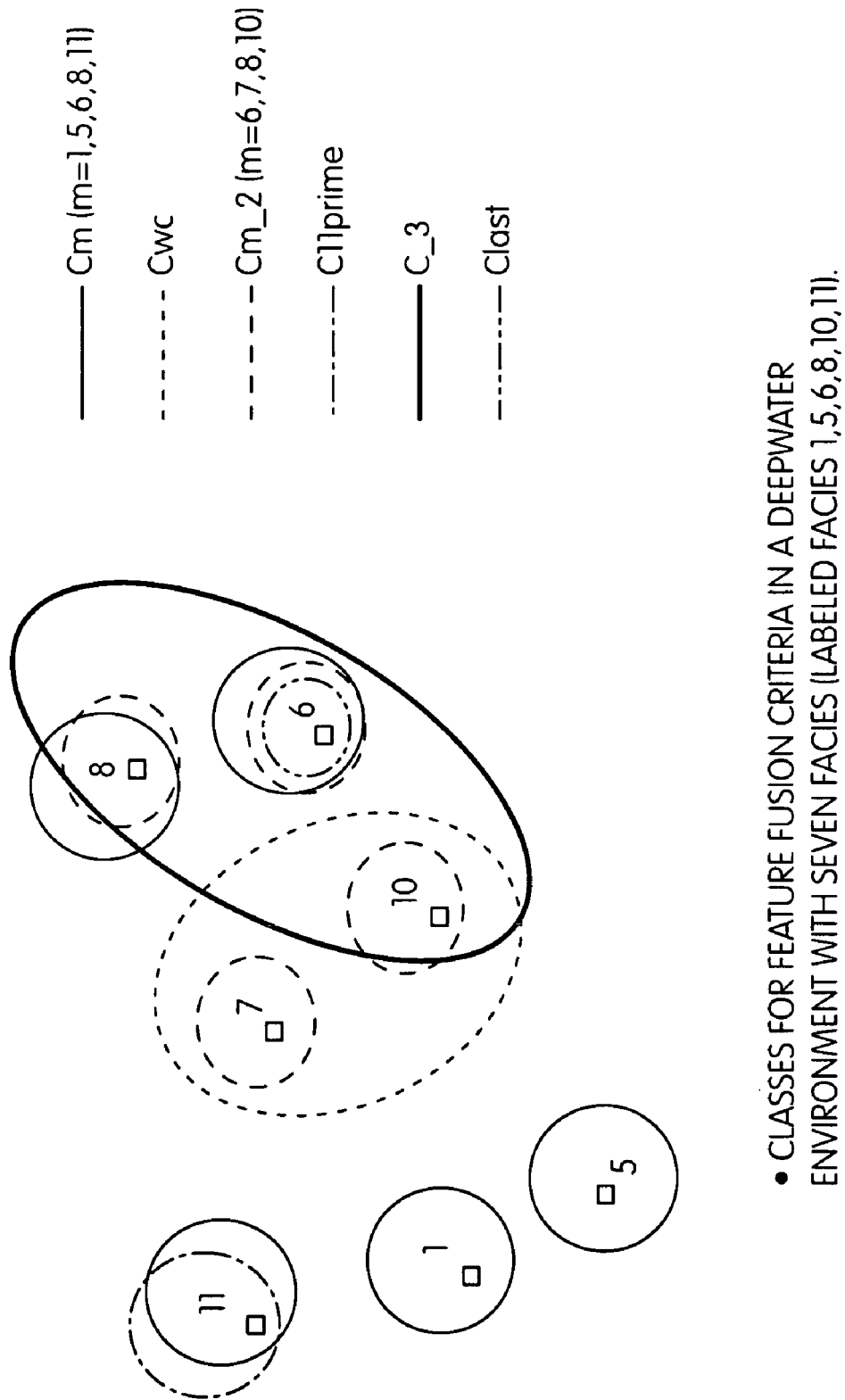

In a deepwater depositional environment with, for example, seven facies, the rules in accordance with an embodiment of the invention are based on discerning various classes shown in FIGS. 7a-b.

The rules are based on discerning the following classes:

(i) single-element class Cm consisting of all facies which satisfy the property that the comparison result k1 of their representative samples with distribution of resistivity data may indicate this specific facies m, i.e. k1=m; these classes are labeled C1, C5, C6, C8 and C11 after the number of the corresponding member facies, and the classes C1 and C5 are enclosure classes as described above;

(ii) two-element class Cwc of all facies which satisfy the property that the comparison results k1, k2 and k3 of their representative samples with distributions of resistivity data, and the ⅛ foot scale and ⅟₁₆ foot scale resistivity wavelet transform coefficients distributions of resistivity data, respectively, may indicate facies 7 or 10; this is the class consisting of facies 7 and 10 and is an enclosure class as described above (i.e. the representative samples of these two facies have only these comparison results);

(iii) single-element class Cm_2 of all facies whose representative samples may have comparison results k1=7 and k2=m, with m=6, 7, 8 or 10, respectively to Cm_2, with the resistivity data distribution and the ⅛ foot scale wavelet transform coefficient distribution, respectively; these classes are C6_2, C7_2, C8_2 and C10_2, named after the number of a corresponding member facies, and the class C7_2 is an enclosure class;

(iv) single-element class C11prime consisting of all facies whose representative samples may have comparison results k1 as 7 and k2 belonging to the subset {1,5,11} with the resistivity data distribution and the ⅛ foot scale resistivity wavelet transform coefficient distribution, respectively; this class consists of the facies 11;

(v) three-element class C_3 consisting of all facies whose representative samples may have facies k1=10 indicated by the resistivity data distribution; this class consists of the facies 10, 8 and 6;

(vi) a single-element class Clast consisting of all facies whose representative samples may have comparison results k1=10, k2 belonging to the facies 1, 5, 6 or 7, and k3 belonging to the facies 1, 5 or 6, wherein k1, k2 and k3 are indicated by distributions of resistivity data and its ⅛ foot scale and ⅟₁₆ foot scale wavelet transform coefficients, respectively; this class consists of the facies 6;

In an embodiment, the rules specify the final facies identification based on matching the facies indicated for the given segment to the properties that define the different classes and narrowing down the number of facies whose representative samples may have the same indicated facies as the given segment. First, a primary property or feature d1 distribution such as resistivity data distribution is selected if its comparison results are specified in the properties of all or nearly all classes and a large number of facies is identifiable by this distribution. The next best candidate for such a property may be termed a secondary property. For each given segment, the rules specify the final facies identification in the following way:

(a) it is determined which subsets S1 the facies k1 indicated for the given segment by d1 distribution belongs to among all subsets appearing in the properties of facies indicated by d1 distribution (for representative samples) used to define classes; for each such subset S1, the class C1 is identified such that the representative samples of its facies may have comparison results with the feature d1 distribution to belong to S1 and that all facies in S1 are indicated by representative samples of each of the facies in C1;

(b) if there are single-element classes among all classes C1 found in a), then: (i) if there is a single-element class defined by the sole property that the comparison result of the facies representative samples with d1 distribution may belong to the subset containing k1, then the element of this class is the facies determined as the final classification result for this segment; (ii) if the single element class with the smallest number of distributions needed to define the class property is also defined with other features d2, . . . , dn, and possibly also feature flags, then: 1) if the other comparison results on this segment k2, . . . , kn with d2, . . . , dn, respectively (and feature flags) are consistent with the property of this class, then the element of this class is the facies that corresponds to this segment; 2) if the other comparison results of the given segment are inconsistent with this class, the single-element class with the next-smallest number of property-defining distributions is considered in the same fashion; 3) if there are more than one single-element classes with the same number of property-defining features, these classes are considered in some chosen order of importance;

(c) if there are no single-element classes among classes C1 of facies which satisfy that their representative samples may have a comparison result with feature d1 distribution consistent with that of the given segment, the next-smallest classes are considered in the order analogous to that given in (b), and one uses a method of elimination of those facies in the class which belongs to other classes (and first considered are the enclosure classes) such that the representative samples of facies in these other classes have comparison results that are inconsistent with those of the given segment;

(d) when all indicated facies and feature flags are consistent with properties of representative samples of more than one facies, then a fall-back rule is used. In an embodiment, the fall-back rule in the criteria include the selection of the facies which is given by the comparison result of the primary feature distribution if that feature distinguishes these facies, or the next feature in the order of importance chosen in step (b)(ii) (3).

(e) if the query in (a) results in no classes C1 found, the facies k2 indicated by the secondary feature d2 is considered in the same way as k1 was for the primary distribution, and steps (a)-(d) are carried out; the iteration (e) can be carried out until a facies is found with comparison results consistent with those of the given segment, or until all features used for classification are exhausted in searching for classes C1 for the chosen feature, in which case: (f) a fall-back rule is used that assigns to the segment a facies indicated by the primary feature distribution.

If the facies indicated by all considered distributions (e.g. resistivity and wavelet coefficient distributions at various scales obtained with the first, second and third libraries of training samples) were always the same facies, there would be nothing new to infer from the wavelet coefficient distributions and the intermediate classification based on the measured data would be the final classification (unless more than one of the measured properties and calculated quantities (other than the wavelet transform) are used). However, in the case of inhomogeneous facies with distinct textures shown in resistivity images or other data, wavelet coefficients of these data offer information that is often not present in the measured data distributions.

Figure 8:
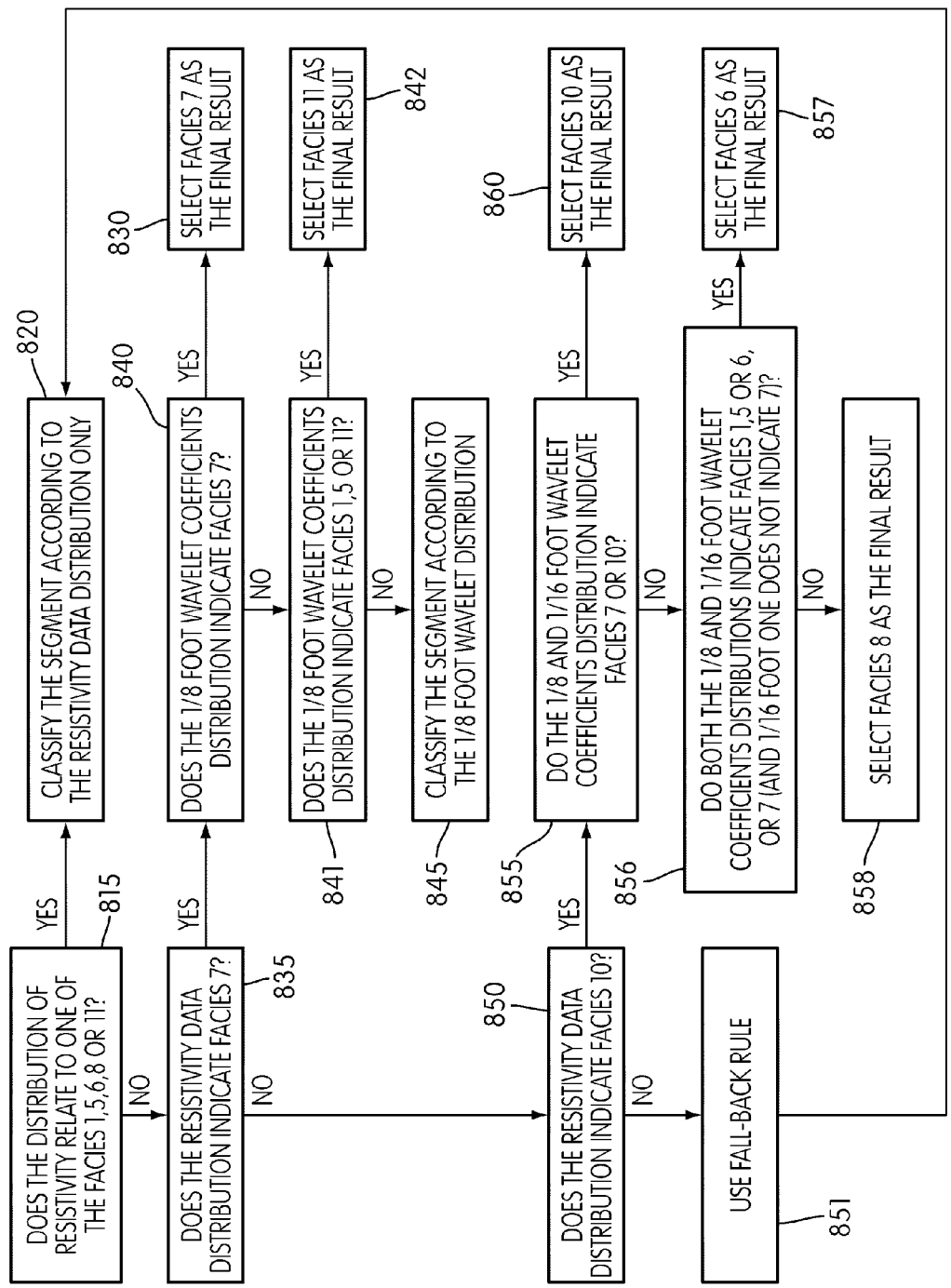
FIG. 8 shows a method for performing feature fusion and final classification in accordance with an embodiment of the invention.

Referring now to FIG. 8, this figure shows an application of the method of feature fusion and final classification (a-f) in accordance with an embodiment of the invention. In this application, the primary property distribution (in step (a)) is the resistivity image data distribution. As illustrated in FIG. 8, the method for performing feature fusion and final classification begins at procedure 815, where it is first determined whether the distribution of borehole data (e.g. image pixels or signal amplitudes) of the closest (known geological facies) match indicates one of the facies uniquely distinguishable by the resistivity distribution (or according to the step (b)(i), facies which are members of a single-facies class with the class property based only on the resistivity distribution). If the result of this inquiry 815 is true (yes), the segment is classified according to the distribution of borehole data (e.g. pixel distribution) only (procedure 820). If the result of this inquiry is false (no), the distribution of borehole data (e.g. pixel distribution) indicates a facies 7 or 10 (necessitating procedures 835 or 850), and the subsequent inquiries also use wavelet coefficient distributions to determine the correct class. Thus, steps (b)(ii) and (c)-(f) may be needed in this case.

The method proceeds to procedure 835 where an inquiry is made as to whether the distribution of borehole data of the closest match (e.g. pixel distribution) indicates facies 7. If the result of the inquiry 835 is true (yes), an inquiry is made as to whether the ⅛ foot wavelet distribution coefficients indicate facies 7 (procedure 840). If the result of the inquiry 840 is true (yes), the method proceeds to procedure 830 where facies 7 is selected for the given segment. This choice illustrates the application of step (b)(ii)(1) and the use of the class property for the class C7_2 in FIG. 7. If the result of the inquiry 840 is false (no), another inquiry is made as to whether the ⅛ foot scale wavelet coefficient distribution indicates a homogeneous facies 1, 5 or 11 (procedure 841). If the result of this inquiry (procedure 841) is true (yes), the segment is classified as facies 11 (procedure 842). This choice illustrates the application of step (b)(ii)(1) and the use of the class property for the class C11prime in FIG. 7. If the result of this inquiry is false (no), the segment is classified according to the facies identified by the ⅛ foot wavelet coefficient distribution (procedure 845). The final classification in this case results from step (b)(ii)(1) applied to the class Cm_2 where m is equal to the facies indicated by the ⅛ foot scale wavelet coefficient k2=m.

If the result of the inquiry at procedure 835 is false (no), the method proceeds to procedure 850 where an inquiry is made as to whether the distribution of borehole data (e.g. pixel distribution) indicates the facies 10. This inquiry is not needed if only two facies of those indistinguishable solely by resistivity are desired to be identified, as by this point in the procedure only the facies 10 is left as a possible intermediate classification result from the resistivity data distribution. If the result of the inquiry 850 is false (no), the procedure could go on to query all classes of facies based on the facies indicated by wavelet coefficient distributions to find if any class has a property consistent with the comparison results on this segment, starting with a different primary distribution as outlined in procedures (a)-(e) (e.g. starting with the ⅛ foot scale wavelet coefficient distribution). However, with the only given classes being those in FIGS. 7a and 7b, no such class will be found and the fall-back rule of step (f) is used (procedure 851—fall-back rule). Thus, if the result of the inquiry 850 is false (no), the facies indicated by the measured data distribution (procedure 820) is selected to classify the given segment (by the fall-back rule 851). If the result of the inquiry 850 is true (yes), the method proceeds to procedure 855 where an inquiry is made as to whether both the ⅛ and ¹⁄₁₆ foot wavelet distribution coefficients indicate facies 7 or 10. If the result of the inquiry 855 is true (yes), the facies 10 is selected as the final result (procedure 860). This is a result of the method of elimination in step (c) applied to the class Cwc to exclude the facies 7 of the class C7_2. If the result of the inquiry 855 is false (no), another inquiry (procedure 856) is made, to determine if both ⅛ foot and ¹⁄₁₆ foot scale wavelet coefficient distributions indicate one of the facies 1, 5, 6 or 7 and the ¹⁄₁₆ foot scale wavelet coefficient distribution does not indicate facies 7. If the result of this inquiry (procedure 856) is true (yes), facies 6 is selected (procedure 857). This is a result of step (b)(ii)(1) applied to the class Clast. If the result is false (no), facies 8 is selected (procedure 858). The latter is a result of the method of elimination in step (c) applied to the class C_3 to exclude the facies 6 of the class Clast and the facies 10 of the class Cwc.

When a more detailed distinction of facies with intricate structure is desired, it may be desirable to include the coefficient distributions from the wavelet transform performed at an angle to the borehole axis. The feature fusion may be more complicated in this case but conceptually transparent; for final classification in the case of a pixel histogram with an intermediate mean, one may rely on the wavelet coefficient histograms and consult the level of certainty (as expressed by similarity measures) from transforms at several angles. If one obtains a good match only at one angle (e.g. ±5°), this is likely to be a facies with directional order. If a few angles give good matches, the result will be linked to a poorly-ordered facies.

Figure 9:
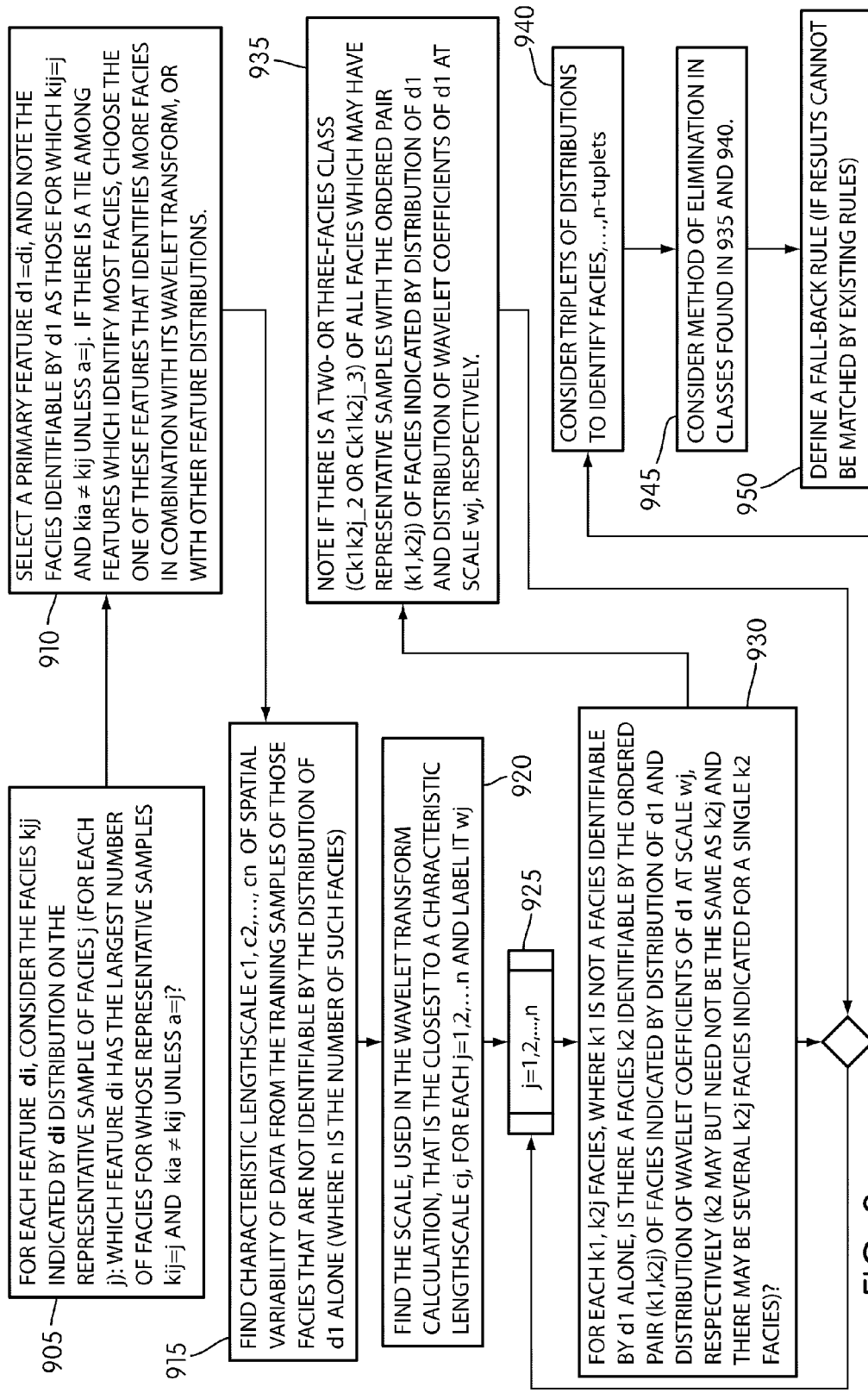
FIG. 9 shows a method of feature fusion and final classification in accordance with an embodiment of the invention.
Figure 10:
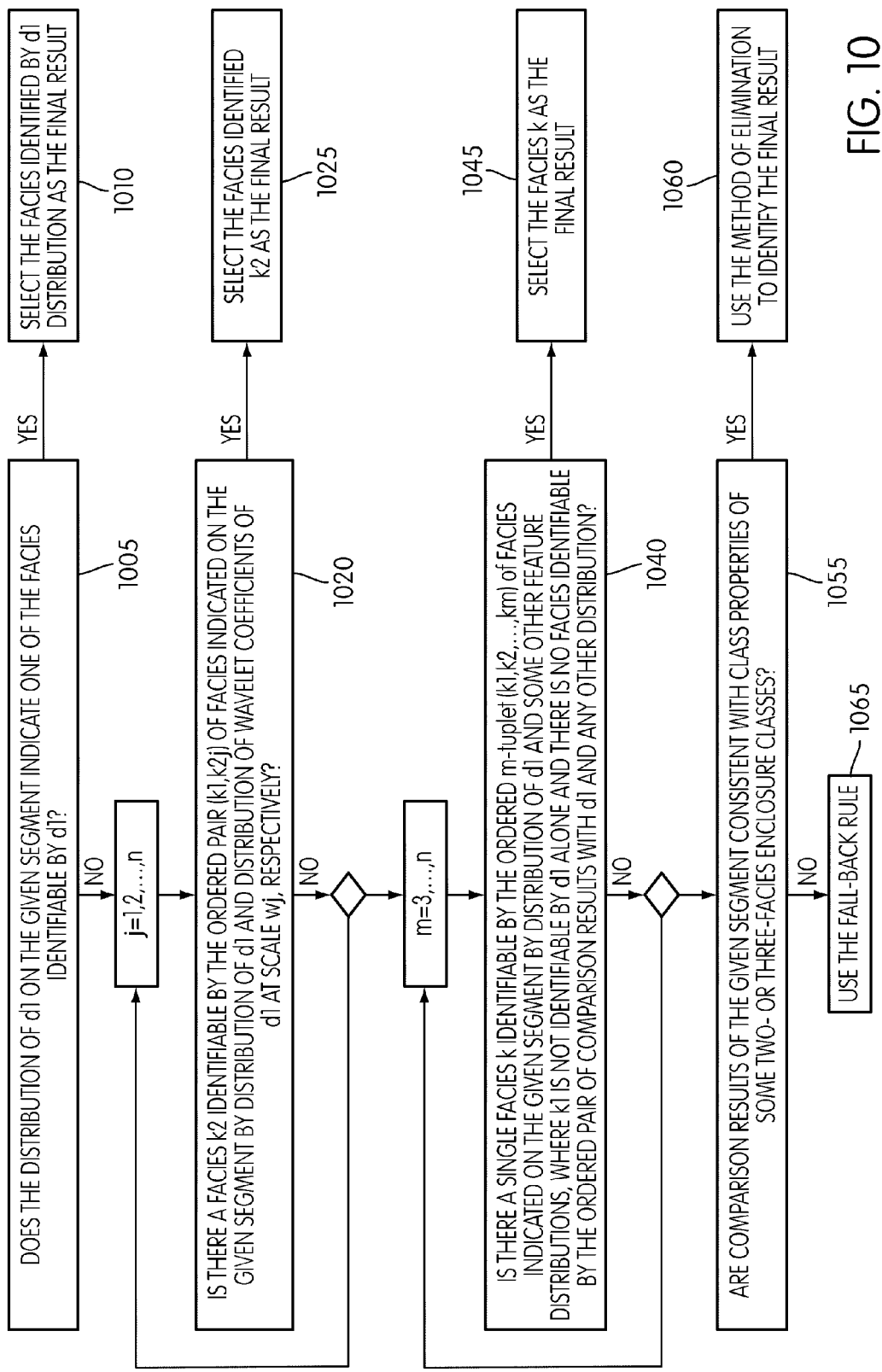
FIG. 10 shows a rule forming method in accordance with an embodiment of the invention

Referring now to FIGS. 9 and 10, these figures more generally illustrate the method of feature fusion and final classification (a)-(f) and the rule forming.

In FIG. 9, the first procedure 905 in forming rules consists of finding one measured or calculated property, which may be referred to as a primary feature, whose distribution alone identifies each facies of a large set or subset of facies used for training. If there are several such distributions, the one which appears in most class properties is chosen according to the step (a) of feature fusion (procedure 910). The next two procedures in forming rules are procedures 915 and 920 of FIG. 9. In procedure 915, the characteristics lengthscale $c_1$, $c_2$, ..., $c_n$ of spatial variability of data from the training samples of those facies that are not identifiable by the distribution of $d_1$ alone (here n is the number of such facies) is determined. In procedure 920, the scale $w_j$ of the scales used in the wavelet transform calculation that is the closest to a characteristic lengthscale $c_j$ for each $j=1, 2, \ldots, n$ of lengthscales which are found in procedure 915 is determined (procedure 925).

After an inspection similar to that of procedure 905 in FIG. 9 of ordered pairs of facies $k_1$ and $k_{2j}$ indicated for representative samples by the $d_1$ distribution and the corresponding wavelet coefficient distribution on scale $w_j$, respectively, (procedure 925), the method proceeds to procedure 930 where identifiable facies are found. For any ($k_1$, $k_{2j}$) for which two or three facies had representative samples with those indicated facies, this finding is noted in procedure 935 so that two-facies and three-facies classes can be formed with the property that they contain all facies with representative samples which may have the corresponding indicated facies ($k_1$, $k_{2j}$). These classes may be useful for the method of elimination in case no facies is identifiable by an ordered pair, triplet, and so on up to an n-tuplet of indicated facies for a given segment with various feature distributions.

If no facies is identifiable by an ordered pair of the facies ($k_1$, $k_2$) indicated for the given segment by any two distributions, the method proceeds to procedure 940 in FIG. 9, where a facies is identified from triplets, quadruplets, and so on to n-tuplets of indicated facies, relying on rules that are formed by procedure 940 in FIG. 9 analogously to the procedure 930. This is step (b)(ii)(2) of the feature fusion.

The facies that is most commonly associated (and thus identified) with having a given ordered n-tuplet of facies indicated by distributions of given measured or calculated (including wavelet transformed) quantities or indicated by feature flags is found from its higher occurrence than that of other facies within results of manual classification on some test set of representative samples which have this given ordered n-tuplet of facies indicated by distributions of these given measured or calculated quantities or feature flags. Furthermore, a method of elimination from classes found in the procedure 935 of FIG. 9 can be deduced in procedure 945 and applied in 1055 of FIG. 10, and finally a fall-back rule is defined in procedure 950 and applied in procedure 1065 of FIG. 10.

In the method of FIG. 10, procedure 1005 consists of specifying a facies for a given segment based on the facies indicated with this segment's primary property distribution if the indicated facies belongs to the large set or subset of facies identifiable by this distribution alone. This corresponds to step (b)(i) of feature fusion in the case when identified and indicated facies are the same. If the result of the inquiry is true (yes), the facies identified by distribution d1 is selected as the final result (procedure 1010). If the result of the inquiry is false (no), the method proceeds to procedure 1020.

Procedure 1020 of FIG. 10 corresponds to the application of finding 930 of FIG. 9: the rules specify a facies k2 for a given segment based on the facies k1 indicated by this segment's primary feature distribution and facies k2j (for each j=1, ..., n) indicated by the corresponding wavelet coefficient distribution on the scale wj if the facies k2 is identifiable by the ordered pair of indicated facies (k1, k2j) by these distributions and the facies indicated by the primary feature distribution does not belong to the large set or subset of facies identifiable by this distribution alone. Procedure 1020 of FIG. 10 is an implementation of step (b)(ii)(1) of feature fusion with two distributions. If the result of the inquiry is true (yes), the facies identified k2 is selected as the final result (procedure 1025). If the result of the inquiry is false (no), the method proceeds to procedure 1040.

In procedure 1040 it is determined whether there is a single facies k identifiable by the ordered m-tuplet (k1, k2, ..., km) of facies indicated on the given segment by distribution of d1 and some other feature distributions, where k1 is not identifiable by d1 alone and there is no facies identifiable by the ordered pair of facies indicated by d1 and any other distribution. If the result of the inquiry is true (yes), the facies k is selected as the final result (procedure 1045). If the result of the inquiry is false (no), the method proceeds to procedure 1055 where it is determined whether there are comparison results of the given segment consistent with class properties of some two- or three-facies enclosure classes. If the result of the inquiry is true (yes), a method of elimination is used to identify the final result (procedure 1060). If the result of the inquiry is negative, a fall-back rule is used (procedure 1065).

The feature extraction and feature fusions according to the embodiment of the invention shown in FIGS. 1, 6 and 7 were tested on part of the actual well OBMI resistivity data (520, shown at column 4 of FIGS. 5a-b). Very good results were obtained in this case. The results of preliminary testing indicate an approximately 80% success rate on 50 samples roughly uniformly distributed over seven facies except that there were only a few samples of slurry and sandy mass flow. As both the correctly and the incorrectly identified facies span all of these seven, it is extremely unlikely that this success rate could have been due to either random picking or picking heavily biased to one or two facies.

As noted above, column 1 of FIG. 5a displays the gamma ray log, 505; column 3 shows the measured depth down the borehole and column 4 shows the normalized resistivity traces; column 5 marks segment boundaries from a segmentation algorithm; column 6 of FIG. 5a displays resistivity (i.e. pixel histogram) for each 1 foot of data and columns 7-9 display wavelet coefficient distribution for 1/16 foot scale for each 3 feet of data on a log scale (column 7), 1 foot of data on a log scale (column 8) and 1 foot of data on a linear scale (column 9).

Column 2 of FIG. 5a shows the geological facies index as identified by manual interpretation. In column 2, the numbers used to label facies are the same as those used in the description of the example with classes shown in FIGS. 7a-b.

Referring now to columns 13-16 of FIG. 5a, these columns illustrate intermediate classification results that are obtained in accordance with the method shown in FIG. 6. These results are stated as facies code divided by 10 and the corresponding similarity measures—with facies code (divided by 10) in column 13 for resistivity, in column 14 for wavelet coefficients on scales 1/32, 1/16 and 1/8 foot. Columns 15 and 16 display probabilities $(Q(\chi^2,v))$ for matching 1/16 foot scale and 1/8 foot scale, respectively, wavelet coefficient distributions to those of facies training samples.

As noted above, columns 17-20 of FIG. 5a are analogous to columns 13-16 but differ in that the training sample for the facies 8 is different. As shown in FIG. 5a, the displayed probabilities are the same in columns 19 and 20 as in columns 15 and 16 respectively with the exception of the probabilities of matching to facies 8 training sample (for example in the region shown below x500 feet in this figure).

Columns 21 to 23 of FIG. 5a are analogous to columns 17-19, respectively, (with the same training samples), except that large segments were not partitioned into 3 foot blocks. There is no change in column 21 right below x519 feet, contrary to columns 13 and 17.

The representative test segments and final facies assigned on this portion of the image log based on the intermediate classification results in columns 13-14 of FIG. 5 are shown in Table 1. Among all the segments obtained by a routine segmentation, the representative test segments are only those which are entirely within the geological facies segments (column 2 of FIG. 5) and do not cross sinusoidally-shaped thick-bed boundaries on the OBMI image of column 4. In this fashion, the accuracy of classification is assessed. Table 1 also shows the comparison between the classification results obtained with the method according to an embodiment of the invention and the classification obtained by manual image classification and shown at column 2 of FIGS. 5a-b.

TABLE 1

| Depth (feet) | Final facies identification | Manually interpreted facies | Agreement? |
|---|---|---|---|
| x451.5-x454.5 | 7 | 7 | Yes |
| x469-x469.5 | 1 | 1 | Yes |
| x487-x489.5 | 1 | 1 | Yes |
| x501-x504 | 8 | 8 | Yes |
| x505.75-x508 | 11 | 8 | No |
| x511.75-x513.75 | 8 | 6 | No |
| x513.75-x516.75 | 10 | 11 | No |
| x541.25-x543 | 1 | 1 | Yes |
| x543.75-x546.75 | 10 | 10 | Yes |
| x583-x586 | 8 | 8 | Yes |
| x605-x608 | 11 | 11 | Yes |
| x615-x617 | 11 | 11 | Yes |
| x626-x629 | 10 | 10 | Yes |

Table 1 illustrates well the agreement of about 80% between the facies found by the automated method and the manually interpreted facies for the sample segments of interest. This agreement was also found in testing the method on fifty samples. The distributions of wavelet coefficients for both $\frac{1}{16}$ and $\frac{1}{8}$ foot scales displayed in column 14 of FIG. 5a indicate the correct class for segment [x505.75-x508]. Also, it is noted that a classification with larger segments such as that shown in column 21 of FIG. 5a identifies the correct class for segment [x513.75-x516.75].

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC including machine executable instructions and programmed to execute the methods, a computer array or network, or other appropriate computing device. As a further example, it is to be understood that the present invention contemplates that, to the extent possible, one or more features of any embodiment can be combined with one or more features of any other embodiment.

What is claimed is:

1. A computer implemented method of analyzing characteristics of a subterranean formation comprising:
   applying, via a computer processor, a wavelet transform to measured data or to derived data obtained from the measured data, or to a portion thereof, the measured data obtained by measuring at least one physical property at each of a plurality of positions in a borehole that penetrates a region of the subterranean formation;
   selecting one or more scales for analyzing wavelet coefficients at each scale;
   performing a segmentation of the measured or derived data;
   calculating, via a computer processor, a distribution of wavelet coefficients for each scale, for one or more spatial directions of wavelet transform application, for the wavelet transform of the measured or derived data and for each segment that belongs to the portion on which the wavelet transform has been calculated; and
   for each segment, analyzing a distribution of the measured or derived data and the distribution of the wavelet coefficients for each scale in terms of their overlap with corresponding distributions of training samples to produce a geological interpretation of the subterranean formation.

2. The method of claim 1, wherein the training samples are representative of facies identifiable by a geologist.

3. The method of claim 1, wherein the one or more scales are comparable to length scales of characteristic variations of the measured data.

4. The method of claim 1, further comprising repeating performing a segmentation, calculating a distribution of data and of wavelet coefficients and analyzing the distributions in an iterative fashion until a predetermined condition is met.

5. The method of claim 1, wherein the wavelet transform is applied to each measurement trace from a multiple-trace measurement tool and the distribution of wavelet coefficients is calculated by gathering wavelet coefficients of all traces.

6. The method of claim 1, wherein the measured data or the derived data are depth-readjusted after applying the wavelet transform.

7. The method of claim 1, wherein the segmentation of the data is performed by splitting well logs into intervals of substantially equal length that may overlap by a predetermined fixed length.

8. The method of claim 1, wherein the analyzing includes, for each segment and each scale, determining a facies indicated by the wavelet coefficient distribution for the segment and scale as a facies represented by the training samples whose corresponding distribution of wavelet coefficients most closely corresponds to the calculated distribution of wavelet coefficients in the segment.

9. The method of claim 8, wherein the correspondence between the calculated distribution of wavelet coefficients and the distribution of wavelet coefficients of the one of the training samples is based on a similarity measure using a chi-square statistics.

10. The method of claim 8, wherein the analyzing further comprises, for each segment, determining a facies indicated by the distribution of measured or calculated data as a facies represented by the training samples whose corresponding distribution of data most closely corresponds to the distribution of the measured or derived data.

11. The method of claim 10, wherein the correspondence of the distribution of the measured or derived data and the distribution of data of the one of the training samples is based on a similarity measure using a chi-square statistics.

12. The method of claim 1, wherein the wavelet transform is applied to each trace of a multiple-trace data, and the analyzing includes grouping multiple-trace data into groups of traces that are measured in spatial proximity of each other around the borehole, and for each scale, each segment and each group of traces, determining a facies indicated by the wavelet coefficient distribution for the scale, segment and group of traces, as a facies represented by the training samples whose corresponding distribution of wavelet coefficients at that scale most closely corresponds to the distribution of wavelet coefficients of the measured or derived data for the given scale, the given segment and given group of traces, and
   wherein the indicated facies from each group of traces' distributions of data and wavelet coefficients for each scale for a given segment are compared to infer if their variability around the borehole suggests a facies of a discontinuous type, and if their variability suggests a facies of a discontinuous type, the facies indicated by the distribution of wavelet coefficients of all traces in the segment is determined to be the discontinuous facies.

13. The method of claim 1, wherein the analyzing includes performing a final identification of a facies for each segment using rules which specify the final facies for a segment based on the facies indicated by the distributions of wavelet coefficients, on the facies indicated by distributions of measured or derived data or both, wherein the distributions of wavelet coefficients and the distributions of measured or derived data are calculated for the segment as a whole or for groups of traces in that segment.

14. The method of claim 13, wherein the rules include discerning a plurality of classes that each include at least one facies, each facies attributed to one or more of the classes based on the facies indicated by the segment's distributions of wavelet coefficients at various scales and the distribution of the measured or derived data, or both.

15. The method of claim 14, wherein the rules include first determining one primary property as a measured or calculated property whose distribution alone identifies each facies of a large set or subset of facies of the training samples.

16. The method of claim 15, wherein the rules include a final identification of a facies for a given segment as the facies indicated by the segment's distribution of the primary property if the indicated facies belongs to the large set or subset of facies identifiable by the primary property distribution alone.

17. The method of claim 16, wherein the rules include identifying a scale wj, of the scales used in the wavelet transform application, that is the closest to a characteristic lengthscale cj (where j=1, 2, ..., n) of variability of data from the training samples, where n is the number of facies not identifiable by the distribution of the primary property alone.

18. The method of claim 17, wherein the rules include a final identification of a facies k2 for a given segment based on (a) a facies k1 indicated by the distribution of the primary property of said segment and (b) a facies k2j indicated by the corresponding distribution of wavelet coefficients on the scale wj, if (i) the facies k2 is identifiable by the ordered pair of indicated facies (k1, k2j) and (ii) the facies k1 does not belong to the large set or subset of facies identifiable by the primary property distribution alone.

19. The method of claim 18, wherein the rules include specifying the final facies of said segment by determining which facies is most commonly associated with having a same ordered triplet of indicated facies as said segment's ordered triplet of facies (k1,k2j,k3k) indicated by (a) the distribution of the primary property, (b) the distribution of corresponding wavelet coefficients at the lengthscale wj and (c) the distribution of the wavelet coefficients at another lengthscale wk, respectively, if the facies is not identifiable by (i) the distribution of the primary property alone, or by (ii) the ordered pair of indicated facies (k1,k2j) at any of scales wj.

20. The method of claim 1, wherein the wavelet transform is an orthogonal wavelet transform.

21. The method of claim 20, wherein the wavelet transform is a Daubechies wavelet with two vanishing moments.

22. The method of claim 1, wherein the measured physical quantity is an electrical signal and the characteristic is a resistivity or an impedance of the subterranean formation.

23. The method of claim 1, wherein the measured physical quantity is a gamma ray signal and the characteristic is natural gamma radiation of the subterranean formation.

24. A non-transitory computer readable medium containing computer instructions stored therein for causing a computer processor to perform a method for analyzing characteristics of a subterranean formation, the method comprising:
  applying a wavelet transform to measured data or to derived data obtained from the measured data, or to a portion thereof, the measured data obtained by measuring at least one physical property at each of a plurality of positions in a borehole that penetrates a region of the subterranean formation;
  selecting one or more scales for analyzing wavelet coefficients at each scale;
  performing a segmentation of the measured or derived data
  calculating a distribution of wavelet coefficients for each scale, for one or more spatial directions of wavelet transform application, for the wavelet transform of the measured or the derived segmented data and for each segment; and
  for each segment, analyzing the distribution of the measured or derived data and the distribution of the wavelet coefficients for each scale in terms of their overlap with corresponding distributions of training samples to produce a geological interpretation of the subterranean formation.

\* \* \* \* \*